United States Patent
Lin

(10) Patent No.: US 8,462,459 B1
(45) Date of Patent: Jun. 11, 2013

(54) METHOD AND SYSTEM FOR DETERMINING RELATIONSHIP BETWEEN HARD DISK DRIVE THROUGHPUT AND VIBRATION SOURCE

(75) Inventor: Yi-Jiun Lin, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 13/615,570

(22) Filed: Sep. 13, 2012

(30) Foreign Application Priority Data

Mar. 19, 2012 (TW) .............................. 101109306 A

(51) Int. Cl.
*G11B 21/02* (2006.01)
*G11B 5/596* (2006.01)

(52) U.S. Cl.
USPC .......................................... 360/75; 360/78.12

(58) Field of Classification Search
USPC ............... 360/75, 78.12, 97.01, 97.02, 294.4, 360/97.19, 78.01, 77.03, 48, 77.02, 25; 702/34, 702/56
See application file for complete search history.

(56) References Cited

U.S. PATENT DOCUMENTS

| | | | |
|---|---|---|---|
| 6,665,617 B2 | 12/2003 | Shobayashi | |
| 6,963,463 B2* | 11/2005 | Sri-Jayantha et al. | 360/75 |
| 7,375,911 B1* | 5/2008 | Li et al. | 360/75 |
| 7,586,712 B2* | 9/2009 | Cho et al. | 360/78.01 |
| 7,724,457 B2* | 5/2010 | Dang et al. | 360/48 |
| 7,761,244 B2 | 7/2010 | Gross et al. | |
| 8,204,716 B2* | 6/2012 | Gross et al. | 702/183 |
| 2010/0326193 A1 | 12/2010 | Gross et al. | |

* cited by examiner

*Primary Examiner* — Ali Neyzari
(74) *Attorney, Agent, or Firm* — Li & Cai Intellectual Property Office

(57) ABSTRACT

A method for determining a relationship between a hard disk drive throughput and a vibration source adapted in a computer device having a hard disk drive and the vibration source is disclosed. The method includes receiving a vibration sensing signal associated with the vibration source and a hard disk drive throughput rate associated with operations of the hard disk drive substantially at the same time, deriving a vibration sensing frequency function and a hard disk drive frequency function, determining whether a linear relationship exists between the vibration sensing frequency function and the hard disk drive frequency function, comparing the vibration sensing frequency function and the hard disk drive frequency function to derive a vibration information, and generating a counter vibration control signal according to the vibration information.

19 Claims, 10 Drawing Sheets

METHOD AND SYSTEM FOR DETERMINING RELATIONSHIP BETWEEN HARD DISK DRIVE THROUGHPUT AND VIBRATION SOURCE

BACKGROUND OF THE INVENTION

1. Field of the Invention

The instant disclosure relates to a method and system for countering vibrations, and more particularly, to a system and method that is capable of determining a relationship between a hard disk drive throughput and a vibration source.

2. Description of Related Art

Generally speaking, computer systems such as servers, disk storage systems, desktops, and laptops employ at least one storage device such as a hard disk drive for data storage. However, as storage capability of the storage device becomes more and more demanding increasing density of magnetic tracks in the storage device is one option to be considered, making such storage device more susceptible to vibrations, which throughput of the storage device or even cause the same to malfunction.

Please refer to FIG. 1 of a schematic diagram showing a conventional server 1. The conventional server 1 includes a motherboard 11, a fan area 15 including multiple cooling fans 151, a power supply 13, and a hard disk area 17, which is adjacent to the fan area 15. The hard disk area 17 has several hard disk drives placed therein. The power supply 13 is also equipped with its respective cooling fan 131 and a power supply circuit (not shown). The cooling fans 131 and 151 are for helping dissipate heat associated with electronic operations of components so that the electronic components (e.g., the motherboard 11, the power supply 13, and the hard disk drive 171) could be protected from being overheat and as the result damaged. Operations of the cooling fans 131 and 151 and the hard disk drives 171 always accompany with the vibrations, which may cause resonations among the cooling fans 131 and 151 and the hard disk drives 171 and affect the operation of the hard disk drives 171.

To counter the vibrations associated with vibration sources including the cooling fans 131 and 151, damping material may be used to surround the vibration sources or certain spacing for countering the vibrations may be defined between the hard disk drives 171 and the cooling fans 131 and 151. Regardless of the effectiveness of aforementioned vibration countering mechanisms, they must be designed and prepared before the computer systems having those mechanisms are placed into the stream of the commerce. In other words, those mechanisms are unable to make any further adjustment when the computer systems are in operation.

SUMMARY OF THE INSTANT DISCLOSURE

An objective of the instant disclosure is to provide a method for determining a relationship between a hard disk drive throughput and a vibration source adapted in a computer device having a hard disk drive and the vibration source. The method includes receiving a vibration sensing signal associated with the vibration source and a hard disk drive throughput rate associated with operations of the hard disk drive substantially at the same time, deriving a vibration sensing frequency function and a hard disk drive frequency function, determining whether a linear relationship exists between the vibration sensing frequency function and the hard disk drive frequency function, comparing the vibration sensing frequency function and the hard disk drive frequency function to derive a vibration information, and generating a counter vibration control signal according to the vibration information.

The instant disclosure further includes a system disposed in a computer device and capable of determining the hard disk drive throughput and the vibration source. The disclosed system may include a vibration signal generating unit for receiving a timing signal and a vibration amplitude signal generated by a vibration sensing device for the vibration source substantially at the same time, for generating a vibration sensing signal, a data traffic accumulation unit, for receiving the timing signal and read/write information on basis of number of times the hard disk drive writes or reads data in a fixed size during a predetermined data flow sampling time period substantially at the same time, and for generating a hard disk drive throughput rate according to the timing signal and the number of times the hard disk drive writes or reads the data in the fixed size during the predetermined data flow sampling time period, a calculating unit, coupled to the vibration signal generating unit and the data traffic accumulation unit, for receiving the vibration sensing signal and the hard disk drive throughput rate, which is generated along with the vibrations sensing signal substantially at the same time, and performing a time domain-to-frequency domain operation on the vibration sensing signal and the hard disk drive throughput rate in order to prepare a corresponding vibration sensing frequency function and a corresponding hard disk drive flow frequency function, a storage unit coupled to the calculating unit for storing the vibrations sensing frequency function and the hard disk drive flow frequency function, a comparison unit coupled to the calculating unit for the vibration sensing frequency function and the hard disk drive flow frequency function and preparing vibration information affecting the hard disk drive throughput, and a counter vibration driving unit, according to the vibration information for generating a counter vibration control signal.

In order to further the understanding regarding the instant disclosure, the following embodiments are provided along with illustrations to facilitate the disclosure of the instant disclosure.

DETAILED DESCRIPTION OF THE EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 2:
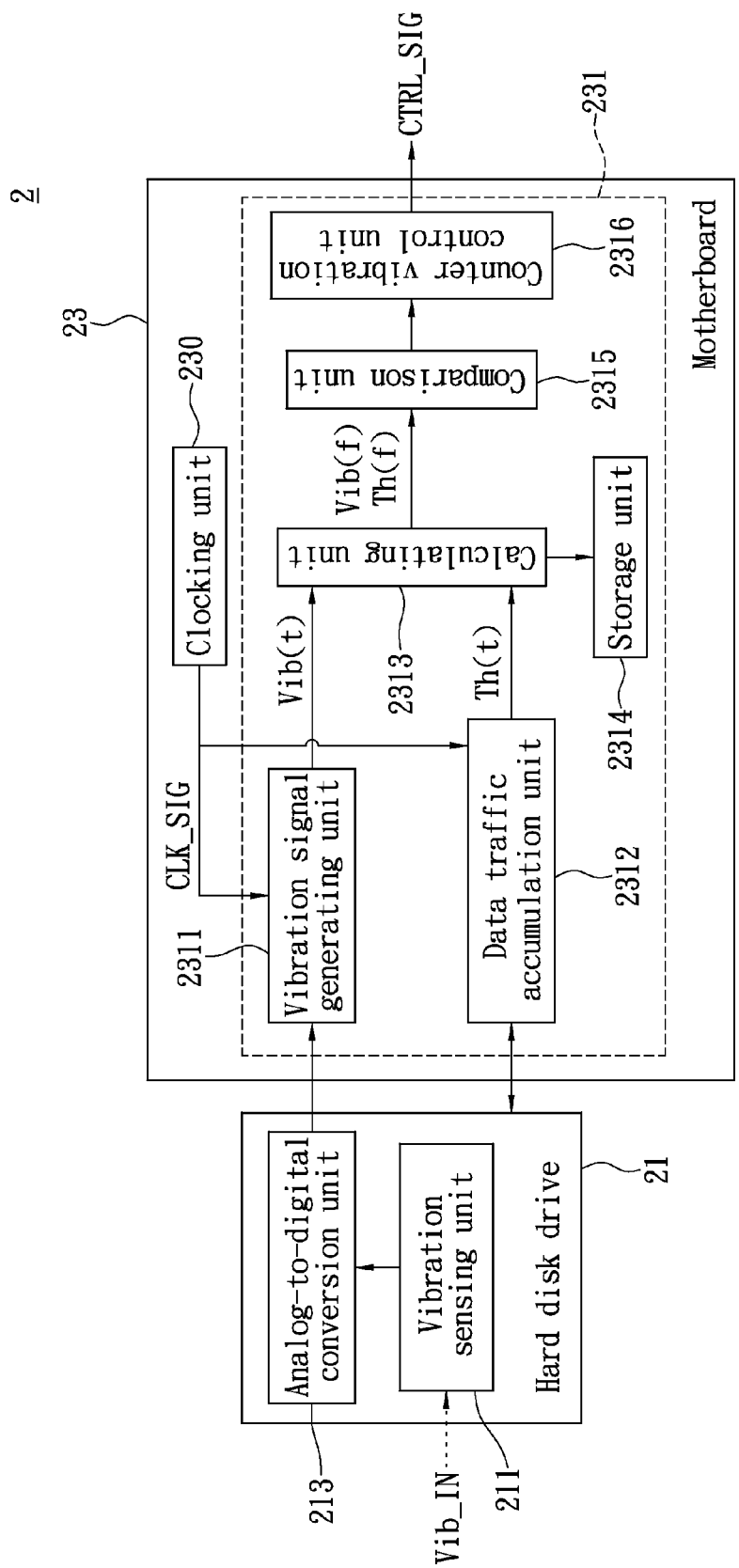
FIG. 2 illustrates a functional block diagram of a computer system capable of determining a relationship between a hard disk drive throughput and a vibration source according to the first embodiment of the instant disclosure.

Please refer to FIG. 2 illustrating a functional block diagram of a computer system 2 capable of determining a relationship between a hard disk drive throughput and a vibration source according to the first embodiment of the instant disclosure. The computer system 2 may include a hard disk drive (HDD) 21 and a motherboard 23 connected to the HDD 21 through a data transmission interface (not shown). In one implementation, the computer system 2 may be a server, while in other implementations the computer system 2 may be a disk storage system, a laptop, or a desktop. The data transmission interface may be SATA-based, SCSI-based, or IDE-based.

The HDD 21 may have a vibration sensing unit 211 for detecting a vibration signal Vib_IN associated with the vibrations of the vibration source in the computer system 2 when the HDD 21 operates (e.g., the data is written into or read from the HDD 21), before transmitting a vibration amplitude signal G_SIG to the motherboard 23 through the data transmission interface. It is worth noting that a processing unit on the motherboard 23 may access the HDD 21 through the data transmission interface at rates that may vary in accordance with the operations of the HDD 21.

The HDD 21 may also include an analog-to-digital conversion unit 213 coupled to the vibration sensing unit 211. The vibration signal Vib_IN may include the information of the intensity of the vibration, and the analog-to-digital conversion unit 213 may perform an analog-to-digital conversion on the vibration amplitude signal and output a corresponding vibration amplitude signal G_SIG to the motherboard 23. In one implementation, the vibration sensing unit 211 and the analog-to-digital conversion unit may be placed on a motherboard of the HDD 21.

The motherboard 23 may include a clocking unit 230 and a vibration sensing determination module 231 coupled to the clocking unit 230, which may output a timing signal CLK_SIG to the vibration sensing determination module 231, with the timing signal CLK_SIG functioning to synchronize the receipt of signals. The vibration sensing determination module 231 may also receive the vibration amplitude signal G_SIG from the analog-to-digital conversion unit 213 through the data transmission interface. Plus, the vibration sensing determination module 231 may determine the number of data writing into or data reading from the HDD 21 during a data flow sampling period t_sample when the motherboard 23 accesses the HDD 21. Specifically, the vibration sensing determination module may synchronize the receipt of the vibration amplitude signal G_SIG and the calculation of the number of the data writing into or reading from the HDD 21 on basis of the timing signal CLK_SIG, so as to determine the variation in the data writing/reading within an uninterrupted period of time, which may indicate or suggest the impact on the throughput of the HDD 21 of the vibrations of the vibration source.

The vibration sensing determination module 231 may include a vibration signal generating unit 2311, a data traffic accumulation unit 2312, a calculating unit 2313, a storage unit 2314, a comparison unit 2315, and a counter vibration control unit 2316. The clocking unit 230 may be coupled to the vibration signal generating unit 2311 and the data traffic accumulation unit 2312, both of which may be further coupled to the calculating unit 2313. Meanwhile, the storage unit 2314 may be coupled to the calculating unit 2313, which may be coupled to the comparison unit 2315 that may be coupled to the counter vibration control unit 2316.

The vibration signal generating unit 2311 may receive the timing signal CLK_SIG and the vibration amplitude signal G_SIG from the analog-to-digital conversion unit 213 substantially at the same time, and have the timing signal CLK_SIG and the vibration amplitude signal G_SIG integrated into a corresponding vibration sensing signal Vib(t), which is a time-domain signal. Integrating the timing signal CLK_SIG and the vibration amplitude signal G_SIG may be conducted by setting the timing signal CLK_SIG on an X-axis and the vibration amplitude signal G_SIG on a Y-axis, before drawing the correspondence between the intensity of the amplitude in the vibration amplitude signal G_SIG to the timing points in the timing signal CLK_SIG.

At the time of integrating the timing signal CLK_SIG and the vibration amplitude signal G_SIG, the vibration signal generating unit 2311 may also record a predetermined period of time frame t_pre, which may be one minute in one implementation. As such, the vibration sensing signal may be representative of the time-domain signal with the vibration amplitude information during the predetermined period of the time frame t_pre.

The data traffic accumulation unit 2312 may receive the timing signal CLK_SIG and calculate the number of the data in a fixed size (e.g., a block) that is written into or read from the HDD 21 during the predetermined data flow sampling period t_sample. Thereafter, the data traffic accumulation unit 2312 may further integrate the timing signal CLK_SIG and the number of the data in the fixed size that is written into or read from the HDD 21 during the predetermined data flow sampling period t_sample into a corresponding hard disk drive throughput rate Th(t). The hard disk drive throughput rate Th(t) is sustained data transfer rate of hard disk drive. Integrating the timing signal and the number of the data in the fixed size that is written into or read from the HDD 21 during the predetermined data flow sampling period t_sample may be implemented by corresponding the number of the data in the fixed size written into or read from the HDD 21 during the predetermined data flow sampling period t_sample to the timing points of the timing signal CLK_SIG.

Similarly, when having the timing signal and the number of the data in the fixed size that is written into or read from the HDD 21 during the predetermined data flow sampling period t_sample integrated, the predetermined period of time frame t_pre may be also recorded. Consequently, the hard disk drive throughput rate Th(t) may be another time-domain signal indicating the number of the data in the fixed size that is written into or read from the HDD 21 during the predetermined period of time frame t_pre.

The calculating unit 2313 may be configured to receive the vibration sensing signal Vib(t) and the hard disk drive throughput rate Th(t) and perform the time domain-to-frequency domain conversion on both the vibration sensing signal Vib(t) and the hard disk drive throughput rate Th(t) in order to derive the corresponding frequency functions. For example, the calculating unit 2313 may perform a Fast-Fourier Transform (FFT) on both the vibration sensing signal Vib(t) and the hard disk drive throughput rate Th(t) to obtain a vibration sensing frequency function Vib(f) and a hard disk drive flow frequency function Th(f).

The rate of the data writing into or read from the HHD 21 depends on factors such as the specification of the HDD 21, the processing speed of the motherboard 23, and the vibrations, the size of the data written into or read from the HDD 21. For example, assume the data writing/reading of the HDD 21 is 64 mb/sec and the size of the data to be written or read from the HDD 21 is 128 mb, the data traffic accumulation unit 2312 may take at least two seconds to calculate the rate of the data writing/reading (or the throughput) of the HDD 21. Accordingly, within the two-second there will be no recording of the data writing/reading, and with the vibration amplitude signal being sampled every one second the throughput of the HDD 21 and the vibration amplitude signal may not be accurately derived.

As such, the embodiment of the instant disclosure also provides an approach for the calculation of the data writing/reading performed by the data traffic accumulation unit 2312, which may be configured to set an analysis bandwidth according the frequency specifications of the HDD 21 such as a maximum throughput. With the configurable analysis frequency, the data traffic accumulation unit 2312 may therefore be capable of calculating a maximum capability of data writing/reading within the analysis bandwidth and sampling periods within the analysis bandwidth for the data writing/reading.

It is worth noting that the data flow sampling period t_sample may be derived on basis of multiples of the analysis bandwidth. For example, the data flow sampling period t_sample may be set to be a half of the analysis bandwidth.

The maximum capability of the data writing/reading within the analysis bandwidth may be the result of having the maximum throughput of the HDD 21 divided by two times of the analysis bandwidth, which may be derived according to Nyquist frequency. Furthermore, in order to ensure the throughput of the HDD 21 or the variation in the number of the data writing/reading within the sampling period, the data traffic accumulation unit 2312 may configure a signal sampling resolution for calculating the fixed size of the data. In doing so, the data traffic accumulation unit 2312 may accurately record each of the data in the fixed size that is written into or read from the HDD 21 during the predetermined period of time frame t_pre.

Assume the analysis bandwidth ranges from 0 to 2 KHz and the maximum throughput of the HDD 21 is 64 mb/sec, the maximum capability of data writing/reading within the analysis bandwidth is 64 mb/2*2K=16 Kb. And further assume the signal sampling resolution is set to 1000 units, the fixed size of the data written into or read from the HDD 21 becomes 16K/1000=16 bytes and the data flow sampling period t_sample is ½*2 KHz=0.25 micro seconds. In other words, for accurately monitoring the variation in the number of the writing/reading of 16-byte data for the HDD 21 the data traffic accumulation unit 2312 may determine if there is any writing/reading of the 16-byte data every 0.25 micro seconds.

The storage unit 2314 may store the vibration sensing signal Vib(t), the hard disk drive throughput rate Th(t), the predetermined period of time frame, the derived vibration sensing frequency function Vib(f), and the hard disk drive flow frequency function Th(f), so that the number of the writing/reading of the data in the fixed size could be accurately recorded.

The comparison unit 2315 may receive and compare the vibration sensing frequency function Vib(f) and the hard disk drive flow frequency function Th(f), before generating the corresponding vibration information. Specifically speaking, the comparison unit 2315 may determine whether a linear relationship exists between the vibration sensing frequency function Vib(f) and the hard disk drive flow frequency function Th(f). If the linear relationship exists between the vibration sensing frequency function Vib(f) and the hard disk drive flow frequency function Th(f) at any of the frequencies thereof, those frequencies may be considered as resonant frequencies Fosc for both the HDD 21 and the vibration source at which point the data writing/reading may be affected.

For the determination of any linear relationship exists at the frequencies of the vibration sensing frequency function Vib(f) and the hard disk drive flow frequency function Th(f), a coherence function may be used and coefficients of the coherence function for the frequencies in the vibration sensing frequency function Vib(f) and the hard disk drive flow frequency function Th(f) may be derived. The coherence function may be represented as:

$$\gamma^2 = \frac{|G_{XY}(f)|^2}{G_{xx}(f)^*G_{yy}(f)}$$

$\gamma^2$, ranging between 0 and 1, represents the coherence function, $G_{XY}(f)$ represents a cross spectrum density between the vibration sensing frequency function Vib(f) and the hard disk drive flow frequency function Th(f), $|G_{XY}(f)|$ represents the absolute value of the cross spectrum density, $G_{XX}(f)$ represents the power spectrum density of the vibration sensing frequency function Vib(f), and $G_{YY}(f)$ indicates the power spectrum density of the hard disk drive flow frequency function Th(f).

The comparison unit 2315 may derive the coefficients for each of the frequencies in the vibration sensing frequency function Vib(f) and the hard disk drive flow frequency function Th(f) on basis of which the relationship between the vibration sensing frequency function Vib(f) and the hard disk drive flow frequency function Th(f) may be determined. For example, when the coefficient of the coherence function is larger than a threshold the vibration sensing frequency function Vib(f) and the hard disk drive flow frequency function Th(f) may exist the linear relationship at the particular frequency corresponding to that coefficient. And that particular frequency may be considered as the resonant frequency Fosc between the vibration sensing frequency function Vib(f) and the hard disk drive flow frequency function Th(f).

Figure 1:
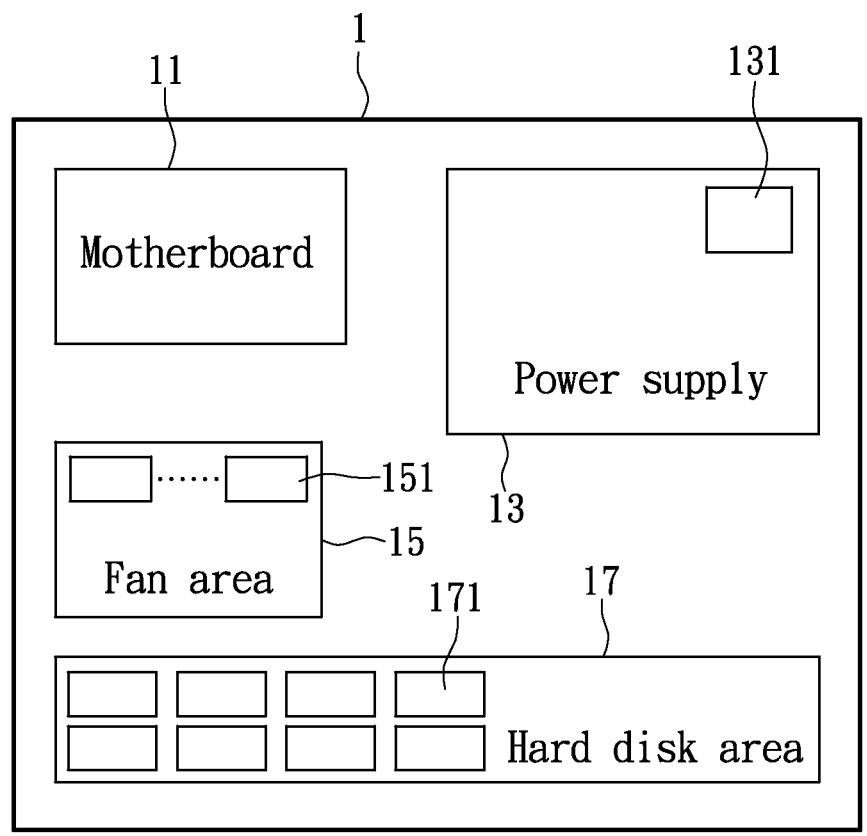
FIG. 1 illustrates a schematic diagram of a conventional server.

The counter vibration control unit 2316 may generate a counter vibration control signal CTRL_SIG according to the vibration information such as the resonant frequency Fosc outputted by the comparison unit 2315 for controlling the vibration source to minimize the occurrence of resonances when both the HDD 21 and the vibration source operate at the resonant frequencies. For instance, if the vibration source is the cooling fan 151 in FIG. 1 the counter vibration control unit 2316 may generate a fan rotating speed control signal for controlling the operations of the cooling fan 151 including reducing the rotating speed of the cooling fan 151. Consequently, the cooling fan 151 may not be operating at the resonant frequency, decreasing the likelihood of the resonance and stabilizing the operations of the HDD 21. In another example, when another hard disk drive becomes the vibration source the counter vibration control unit 2316 may generate a hard disk drive shutdown signal according to the vibration information (e.g., the resonant frequency Fosc) to temporarily stop that hard disk drive from operating or halt any additional access to that hard disk drive.

Thus, the vibration sensing determination module 231 may be able to generate the counter vibration control signal CTRL_SIG for the control over the vibration source to reduce the impact of the vibrations associated with the vibration source, according to the vibration amplitude signal G_SIG, the operation of the HDD 211 (e.g., the number of the writing/reading of the data in the fixed size), and types of the vibration source.

The vibration sensing unit 211 may be a vibration sensor such as an accelerometer, while the analog-to-digital conversion unit 213 may be an ADC converter. The vibration sensing unit 211 and the analog-to-digital conversion unit 213 may be disposed on the motherboard of the HDD 21 and therefore transmit the vibration amplitude signals to the motherboard 23 of the computer system 2 through the data transmission interface. In another implementation, the analog-to-digital conversion unit 213 may be placed on the motherboard 23 or integrated as a part of the motherboard 23. The clocking unit 230 may be a clock generator in one implementation, while the vibration sensing determination module 231 may be a central processing unit (CPU) or a programmable microcontroller. The comparison unit, meanwhile, may alternatively perform a cross correlation upon the vibration sensing frequency function Vib(f) and the hard disk drive flow frequency function Th(f) to determine the relationship between them.

Figure 3:
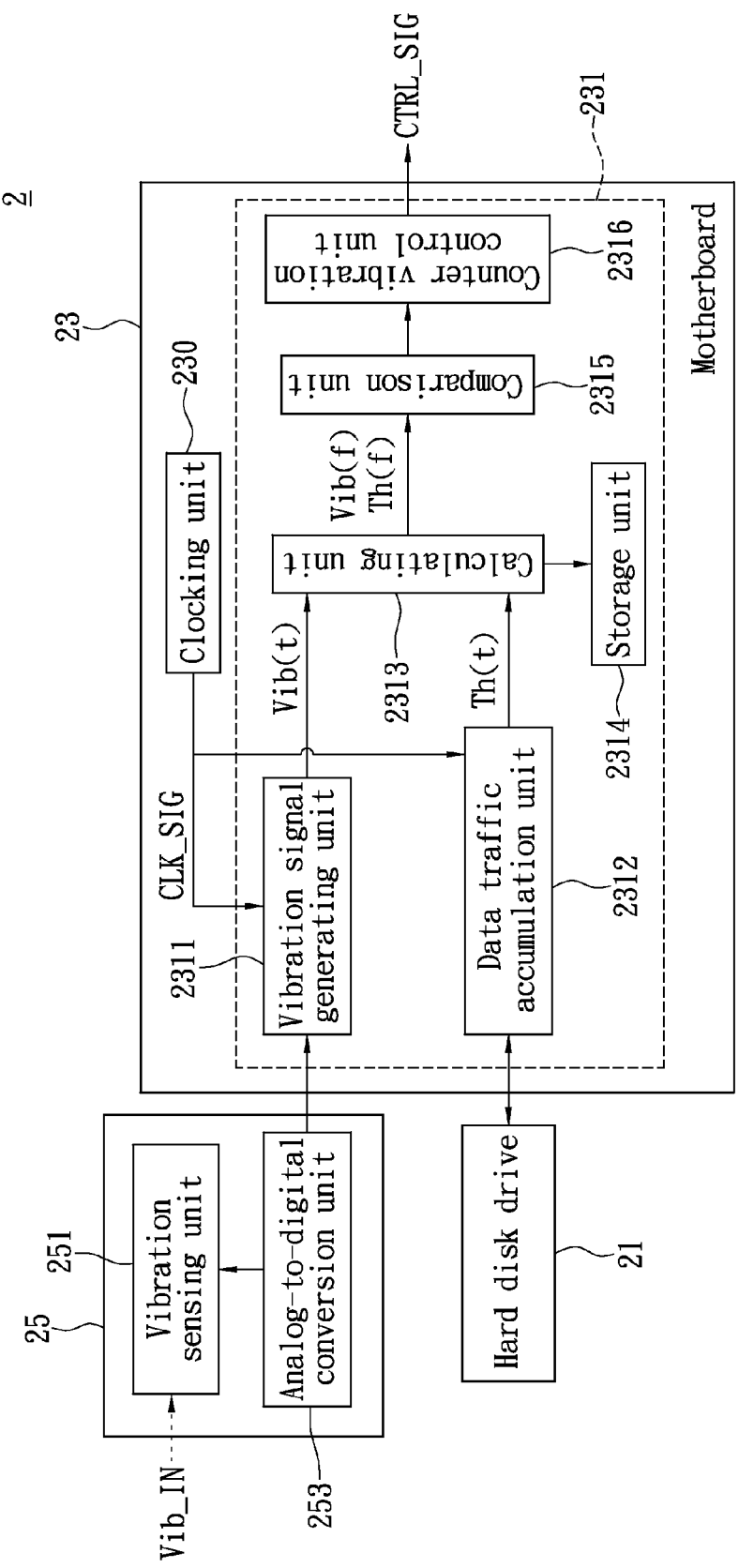
FIG. 3 shows a functional block diagram of a computer system that is capable of determining the relationship between the hard disk drive throughput and the vibration source according to another embodiment of the instant disclosure.

Please refer to FIG. 3 in which a functional block diagram of a computer system that is capable of determining the relationship between the hard disk drive throughput and the vibration source according to another embodiment of the instant disclosure is illustrated. One difference lies between the computer system in FIG. 2 and the computer system in FIG. 3 may be the vibration sensing unit 251 and the analog-to-digital conversion unit 253 may be integrated together into a vibration sensing device 25. And the vibration sensing device 25 may be disposed outside the HDD 21 independently. For example, the vibration sensing device 25 may be placed on the casing of the HDD 21, in the proximity of the HDD 21, or on the casing of the computer system. Additionally, the analog-to-digital conversion unit 253 may be disposed outside the vibration sensing device 25 and placed on the motherboard 23, so that the vibration sensing device 25 may be exclusively devoted to detecting/sensing the vibration signal Vib_IN, which may be further transmitted to the analog-to-digital conversion unit 253 on the motherboard 23.

The vibration sensing unit 251 of the vibration sensing device 25 may sense/detect the vibration signal Vib_IN before the analog-to-digital conversion unit 253 may convert the vibration signal Vib_IN into the vibration amplitude signal G_SIG, which may be transmitted to the vibration sensing determination module 231 through the data transmission interface (e.g., a bus). Thereafter, the vibration signal generating unit 2311 of the vibration sensing determination module 231 may further process the vibration amplitude signal.

Figure 4:
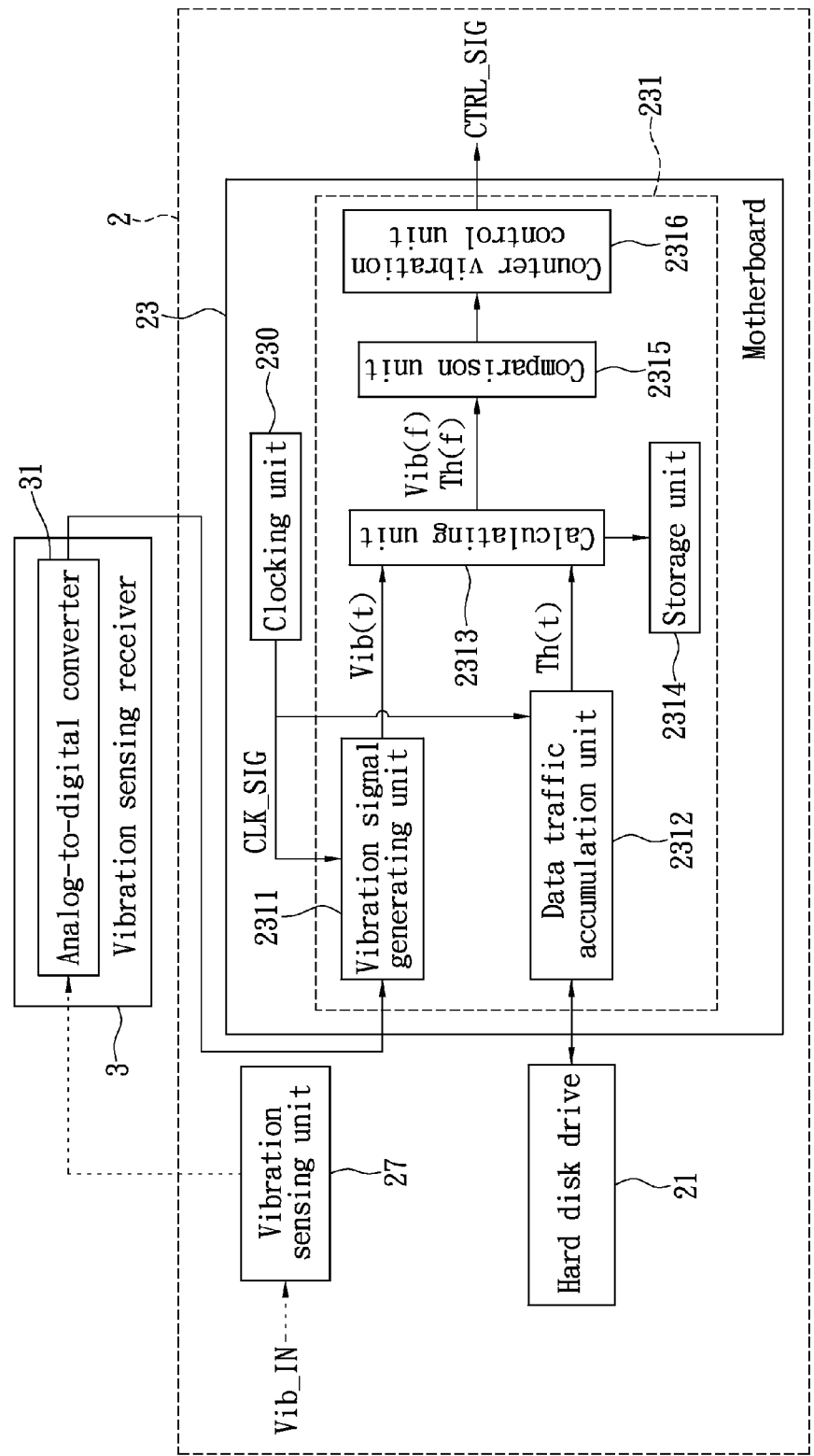
FIG. 4 is a functional block diagram of another computer system that is capable of determining the relationship between the hard disk drive throughput and the vibration source according to another embodiment of the instant disclosure.

Please refer to FIG. 4 in which a functional block diagram of another computer system that is capable of determining the relationship between the hard disk drive throughput and the vibration source according to another embodiment of the instant disclosure is disclosed. Compared with the computer system shown in FIG. 2, the computer system in FIG. 4 may have the vibration sensing unit 27 thereof implemented in terms of a vibration sensor such as an accelerometer and disposed on the motherboard of the HDD 21, in the proximity to the HDD 21 within the computer system, or on the casing of the computer system.

The analog-to-digital conversion unit 31 may be placed within a vibration sensing receiver 3, which may be implemented in terms of an independent device such as a seismometer.

The vibration sensing receiver 3 may receive an output of the vibration sensing unit 27 that may be associated with the vibration signal Vib_IN wirelessly or in a wired fashion. The received output from the vibration sensing unit 27 may be processed by the analog-to-digital conversion unit 31 before the vibration amplitude signal G_SIG may be derived and transmitted to the vibration sensing determination module 231 of the motherboard 23.

The transmission of the vibration amplitude signal G_SIG from the analog-to-digital conversion unit 31 to the vibration signal generating unit 2311 of the vibration sensing determination module 231 through a universal serial bus (USB) or RS-232 bus.

Figure 5:
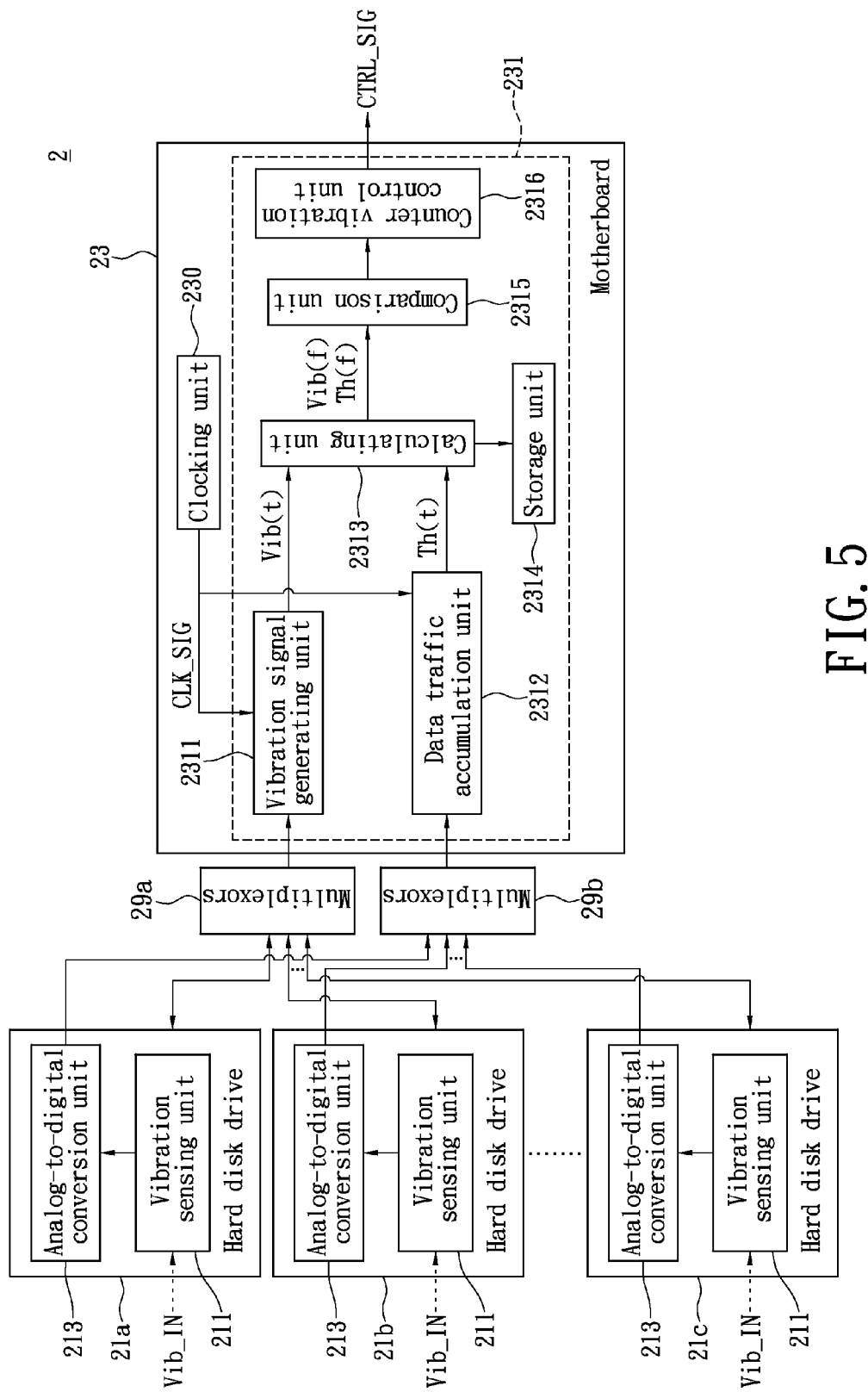
FIG. 5 is another functional block diagram of another computer system that is capable of determining the hard disk drive throughput and the vibration source according to another embodiment of the instant disclosure.

Please refer to FIG. 5 in which another functional block diagram of another computer system that is capable of determining the hard disk drive throughput and the vibration source according to another embodiment of the instant disclosure is illustrated. Compared with the computer systems in FIGS. 2 and 4, the computer system shown in FIG. 5 may have the vibration sensing determination module 231 that is capable of selecting one HDD from multiple HDDs 21a-21n through multiplexors 29a-29b.

Specifically, the vibration sensing determination module 231 may receive the vibration amplitude signal G_SIG from the desired HDD 21n through the multiplexor 29a, while the HDD 21n may still be accessed by the motherboard 23 through the multiplexor 29b, with the data traffic accumulation unit 232 accordingly analyzing the throughput of the selected HDD 21n.

When the computer system detects the throughput of the HDD 21b decreases, the computer system may cause the data in the fixed size may start to be written into or read from the HDD 21b (e.g., by sequentially or randomly reading the data in the fixed size from the HDD 21b). The vibration signal generating unit 231 may control the multiplexor 29a to select the vibration sensing unit 211 for the HDD 21b so that the vibration amplitude signal G_SIG sensed by the vibration sensing unit 211 may be received by the vibration signal generating unit 2311, which may further receive the timing signal CLK_SIG substantially at the same time, for the signal integration purpose. The data traffic accumulation unit 232 may calculate the number of the data in the fixed size that is written into or read from the HDD 21b during the data flow sampling period t_sample while receiving the timing signal CLK_SIG from the clocking unit 230 for the signal integration purpose.

Thereafter, the calculating unit 2313 and the comparison unit 2315 may perform the time domain-to-frequency domain conversion and compare the converted frequency functions, respectively, as previously discussed, in order to derive the vibration information associated with the vibration source. And the counter vibration driving unit 2316 may thus output the counter vibration control signal CTRL_SIG to control the vibration source.

It is worth noting that the vibration sensing unit 211 and the analog-to-digital conversion unit 213 may be integrated into the vibration sensing device that is disposed outside the HDD 21n, which may be on the casing of the HDD 21n, or in the proximity of the HDD 21n.

Figure 6:
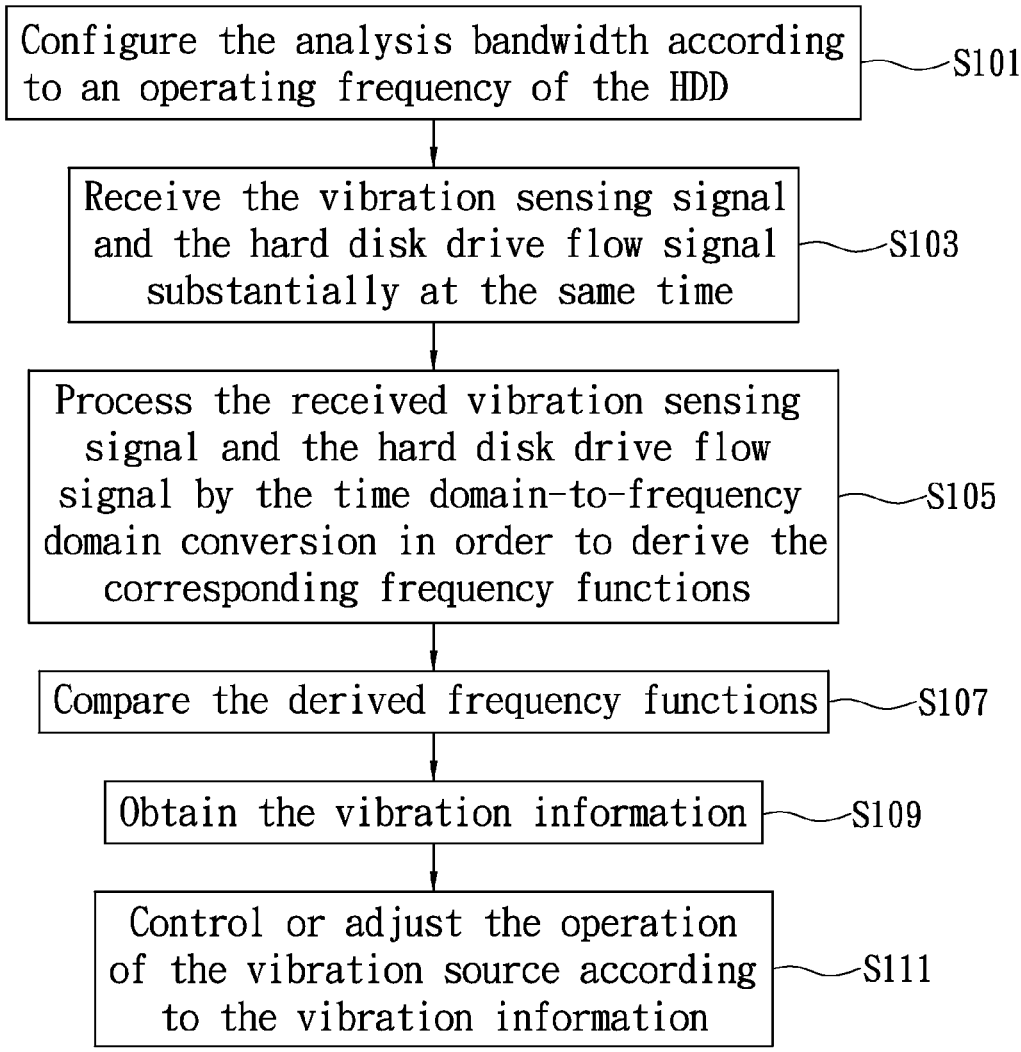
FIG. 6 illustrates a flow chart showing a method of determining the hard disk drive throughput and the vibration source according to one embodiment of the instant disclosure.

In conjunction with FIG. 2, FIG. 6 illustrates a flow chart showing a method of determining the hard disk drive throughput and the vibration source according to one embodiment of the instant disclosure. In step S101, the analysis bandwidth may be configured according to an operating frequency of the HDD 21, before the vibration sensing signal Vib(t) and the hard disk drive throughput rate Th(t) may be received substantially at the same time in step S103. In step S105, the received vibration sensing signal Vib(t) and the hard disk drive throughput rate Th(t) may be processed by the time domain-to-frequency domain conversion (e.g., FFT) in order to derive the corresponding frequency functions Vib(f) and Th(f). The derived frequency functions Vib(f) and Th(f) may be further compared in step S107 in order to obtain the vibration information in step S109. And the vibration information may be further utilized for the output of the corresponding counter vibration control signal in order to control or adjust the operation of the vibration source, for stabilizing the operational efficiency of the HDD 21 (step S111).

Figure 7:
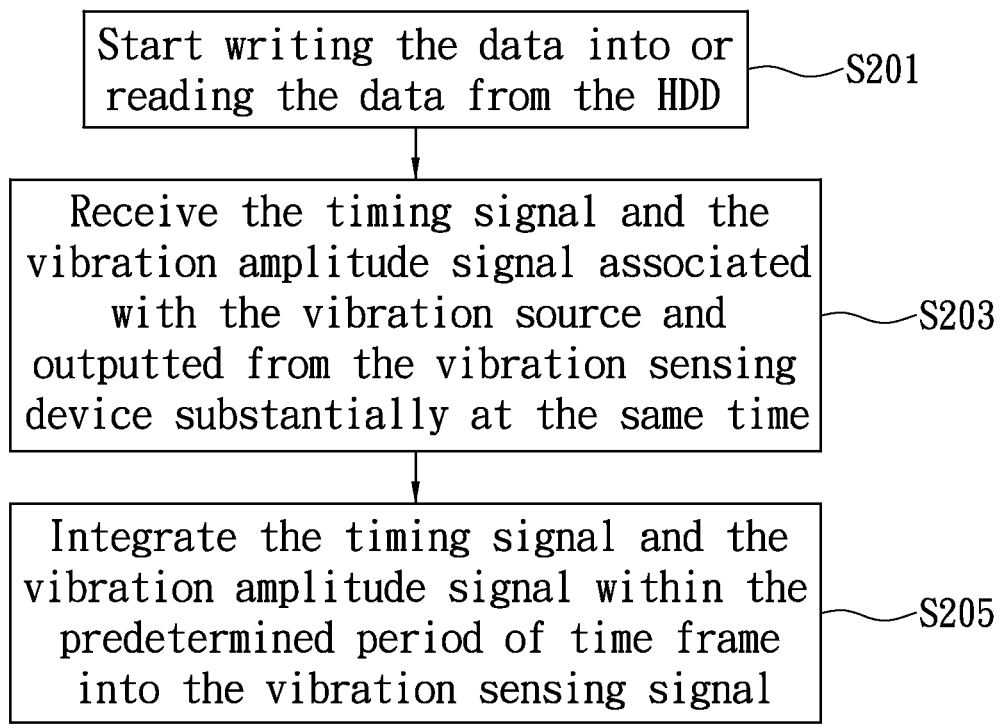
FIG. 7 illustrates a flow of generating the vibration sensing signal Vib(t) according to one embodiment of the instant disclosure.

In conjunction with FIG. 2, FIG. 7 illustrates a flow of generating the vibration sensing signal Vib(t) according to one embodiment of the instant disclosure. The generation of the vibration sensing signal Vib(t) may take place at the time S103 is performed. The processing unit on the motherboard 23 may start writing the data into or reading the data from the HDD 21 in step S201. In one implementation, the data writing/reading may be conducted sequentially or randomly. The vibration signal generating unit 2311 of the vibration sensing determination module 231 may receive the timing signal CLK_SIG from the clocking unit 230 of the motherboard 23 and the vibration amplitude signal G_SIG associated with the vibration source and outputted from the vibration sensing device substantially at the same time in step S203. The vibration sensing device may include the vibration sensing unit 211 and the analog-to-digital conversion 213. The vibration sensing device as previously mentioned may be placed on the motherboard of the HDD 21, in the proximity of the HDD 21 in the computer system, or on the casing of the computer system. In step S205, the vibration signal generating unit 2311 may integrate the timing signal CLK_SIG and the vibration amplitude signal G_SIG within the predetermined period of time frame t_pre into the vibration sensing signal Vib(t), which is a time-domain signal with certain amplitudes in the period of time frame t_pre in which the timing signal CLK_SIG and the vibration amplitude signal G_SIG may exist an one-to-one relationship.

Figure 8:
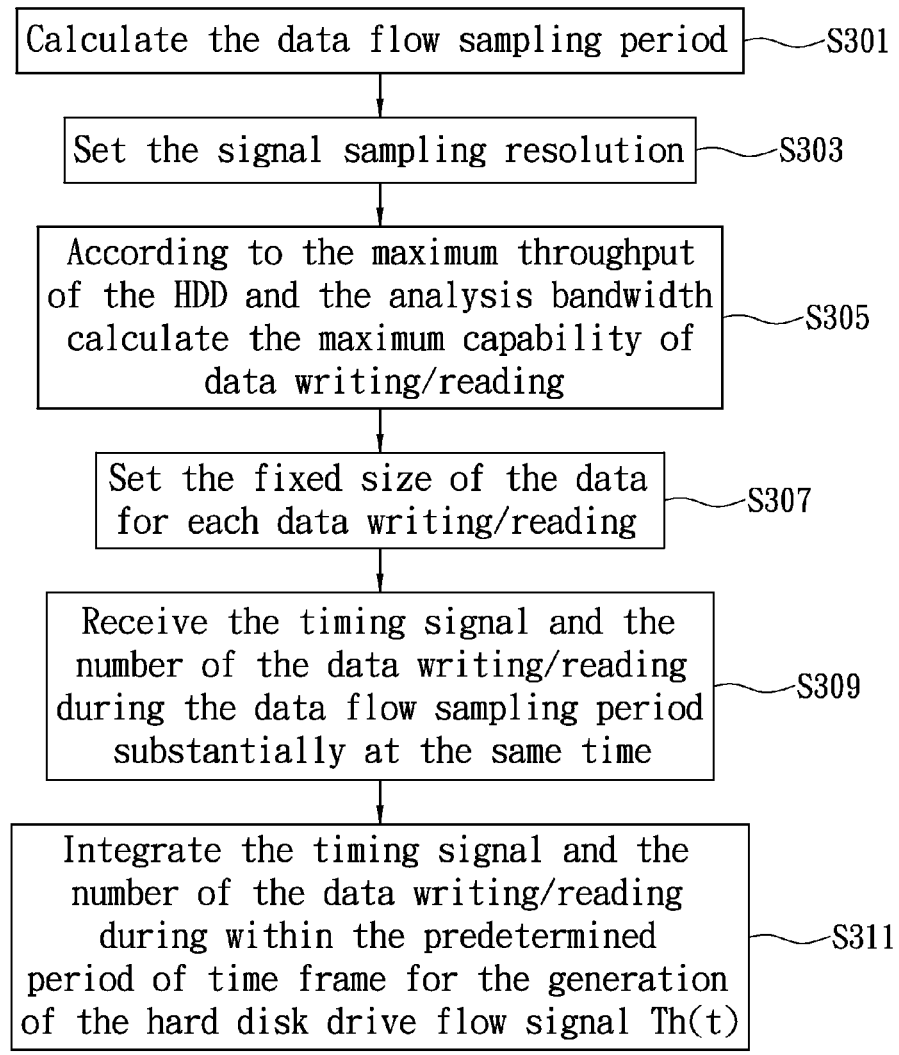
FIG. 8 illustrates a flow of generating the hard disk drive throughput rate Th(t) according to one embodiment of the instant disclosure.

In conjunction with FIG. 2, please refer to FIG. 8 illustrating a flow of generating the hard disk drive throughput rate Th(t) according to one embodiment of the instant disclosure. It is worth noting that the generation of the hard disk drive throughput rate Th(t) may start after S201 in FIG. 7.

The data traffic accumulation unit 2312 may calculate the data flow sampling period t_sample in step S301, which may be configured on basis of the multiples of the analysis bandwidth. For instance, the data flow sampling period t_sample may be 1/8000 seconds, which is two times of the 4000-Hz analysis bandwidth. In step S303, the signal sampling resolution may be configured, which may be set to 1000 units. In step S305, according to the maximum throughput of the HDD 21 (e.g., 64 mb/sec) and the analysis bandwidth, which is 4000 Hz in this example, the maximum capability of data writing/reading may become (64 mb/sec)/(2*4000 Hz)=8 kb.

The data traffic accumulation unit 2312 in step S307 may accordingly set the fixed size of the data for each data writing/reading to (8 kb)/(1000)=8 bytes. The data traffic accumulation unit 2312 may receive the timing signal CLK_SIG and the number of the 8-byte data writing/reading during the data flow sampling period t_sample substantially at the same time in step S309. In step S311, the data traffic accumulation unit 2312 may integrate the timing signal CLK_SIG and the number of data writing/reading during t_sample within the predetermined period of time frame t_pre for the generation of the hard disk drive throughput rate Th(t).

Figure 9:
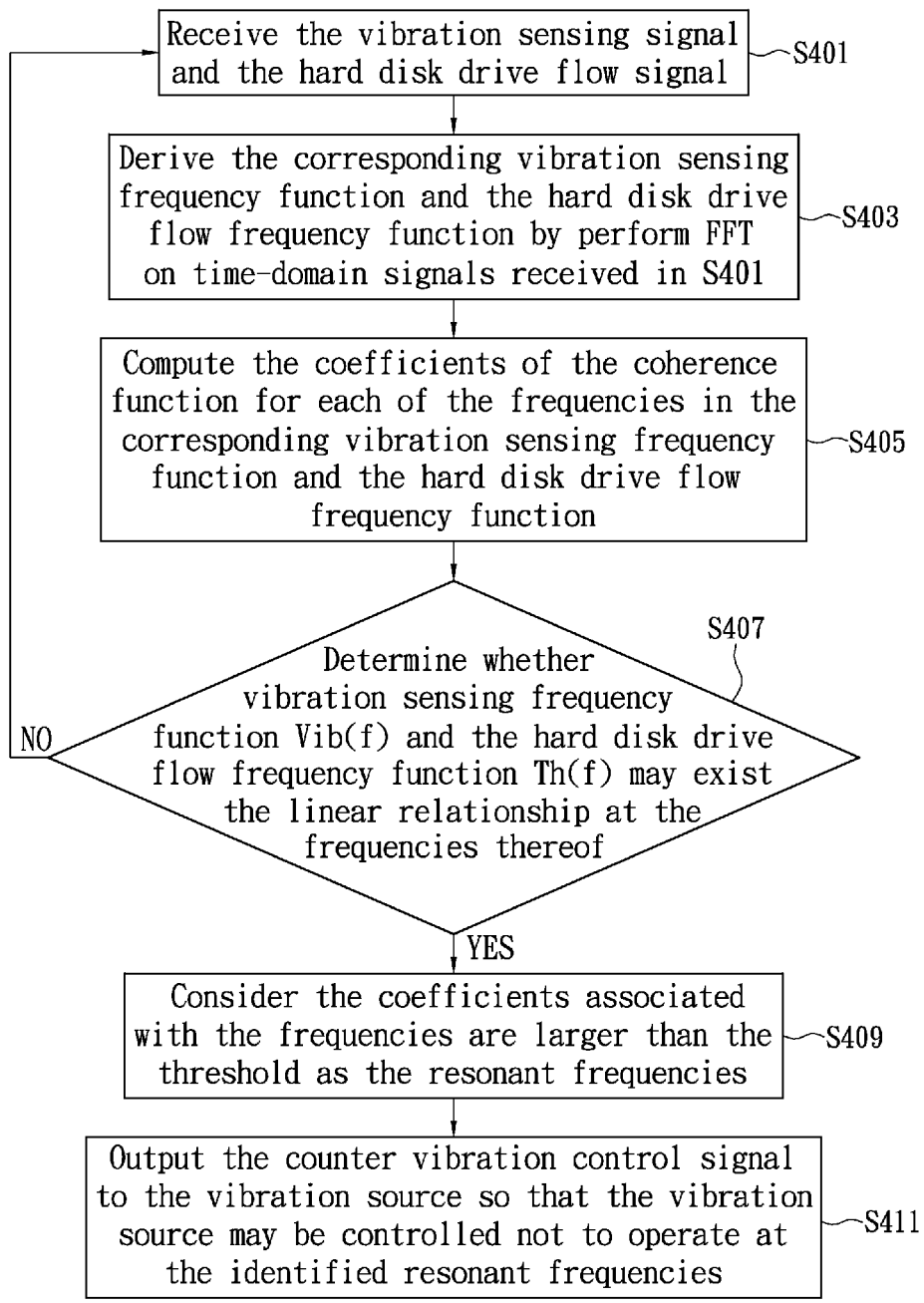
FIG. 9 illustrates a method of comparing the hard disk drive throughput and the vibration source according to one embodiment of the instant disclosure.

In conjunction with FIGS. 2 and 6, FIG. 9 illustrates a method of comparing the hard disk drive throughput and the vibration source according to one embodiment of the instant disclosure. The data traffic accumulation unit 2312 according to the analysis bandwidth and the maximum throughput of the HDD 21 may calculate the maximum capability of data writing/reading in step S401. The calculating unit 2313 may perform FFT on the vibration sensing signal Vib(t) and the hard disk drive throughput rate Th(t) so that the corresponding vibration sensing frequency function Vib(f) and the hard disk drive flow frequency function Th(f) may be derived in step S403. The comparison unit 2315 may compute the coefficients of the coherence function for each of the frequencies in the corresponding vibration sensing frequency function Vib(f) and the hard disk drive flow frequency function Th(f) in step S405. Thereafter, whether the linear relationship exists between the corresponding vibration sensing frequency function Vib(f) and the hard disk drive flow frequency function Th(f) at the frequencies thereof may be determined in step S407. If the linear relationship exists between corresponding vibration sensing frequency function Vib(f) and the hard disk drive flow frequency function Th(f) at certain frequencies, which may be suggested when the coefficients associated with the frequencies are larger than the threshold, those frequencies may be regarded as the resonant frequencies (step S409). With the resonant frequencies, the data traffic accumulation unit 2316 may output the counter vibration control signal CTRL_SIG to the vibration source so that the vibration source may be controlled not to operate at the identified resonant frequencies in step S411.

Figure 10:
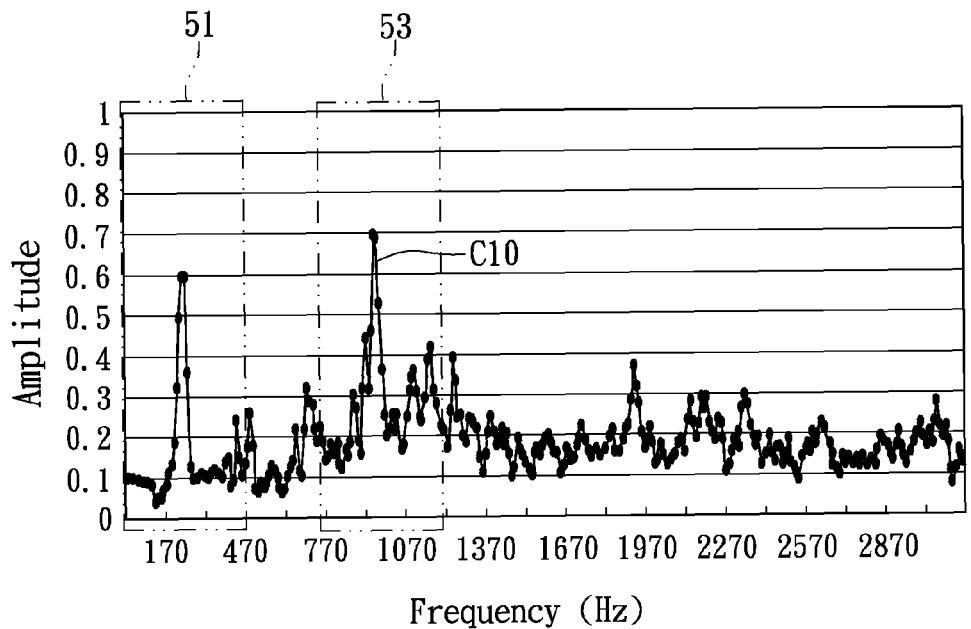
FIG. 10 illustrates the vibration sensing frequency function Vib(f) according to one embodiment of the instant disclosure.
Figure 11:
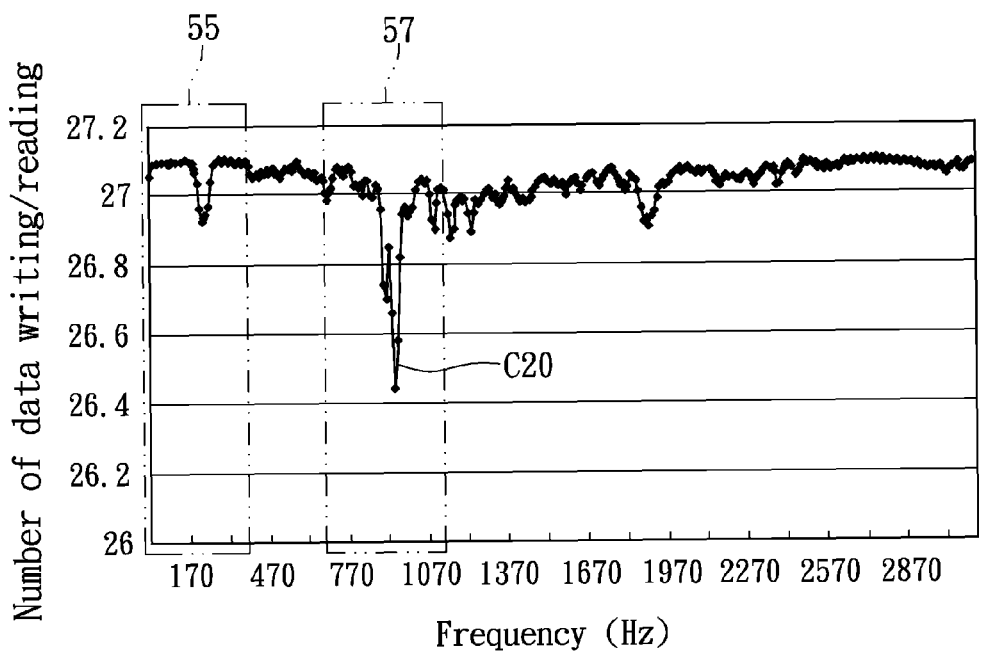
FIG. 11 illustrates the hard disk drive flow frequency function Th(f) according to one embodiment of the instant disclosure.

Please refer to FIGS. 10 and 11, both of which illustrates curves of the vibration sensing frequency function Vib(f) and the hard disk drive flow frequency function Th(f) according to one embodiment of the instant disclosure represented by C10 and C20, respectively. From FIGS. 10 and 11, it may be suggested that the vibration sensing frequency function Vib(f) in areas 51 and 53 and the hard disk drive flow frequency function Th(f) in areas 55 and 57 may exist the linear relationship. Specifically speaking, the curve C10 in the area 51 may have the linear relationship with the curve C20 in the area 55, while the curve C10 in the area 53 may have the linear relationship with the curve C20 in the area 57. As such, the frequency ranges between 170-260 Hz and between 860-960 Hz may be recognized as the resonant frequency ranges.

From FIGS. 10 and 11, the approach provided in the instant disclosure may help determine whether the operation of the vibration source would negatively affect the hard disk drive throughput by pointing to which frequency at which the vibration source may operate would be having the significant impact on the hard disk drive throughput. With the frequencies identified in the process, the counter vibration control signal may be generated accordingly to prevent the vibration source from operating at those frequencies, in order to minimize the impact of the vibrations associated with the vibration source on the hard disk drive throughput.

In short, the instant disclosure is directed to proactively activating the counter vibration mechanism by determining the relationship among the vibration source and the hard disk drive throughput at the operating frequencies. For achieving the aforementioned goal, the instant disclosure may receive the vibration sensing signal and hard disk drive throughput rate substantially at the same time, and compare the corresponding frequency functions of the vibration sensing signal and the hard disk drive throughput rate, in order to derive the vibration information on basis of which the counter vibration mechanism may be activated accordingly. Consequently, the computer system equipped with the approach offered in the instant disclosure may be able to counter the impact of the vibration on the hard disk drive before such impact affects the performance of the hard disk drive so that the performance of the hard disk drive such as the data writing/reading could be more consistent.

The descriptions illustrated supra set forth simply the embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A method for determining a relationship between a hard disk drive throughput and a vibration source adapted in a computer device having a hard disk drive and the vibration source, comprising:
   receiving a vibration sensing signal associated with the vibration source and a hard disk drive throughput rate associated with operations of the hard disk drive substantially at the same time;
   deriving a vibration sensing frequency function and a hard disk drive frequency function respectively after performing a time domain-to-frequency domain transformation on both the vibration sensing signal and the hard disk drive throughput rate;
   determining whether a linear relationship exists between the vibration sensing frequency function and the hard disk drive frequency function;
   when the linear relationship exists deriving a vibration information affecting the hard disk drive throughput by comparing the vibration sensing frequency function and the hard disk drive frequency function; and
   generating a counter vibration control signal according to the vibration information.

2. The method according to claim 1, wherein the vibration sensing signal is generated by receiving a timing signal of the computer device and a vibration amplitude signal prepared by a vibration sensing device for the vibration source substantially at the same time when read/write operations of the hard disk drive are performed, and by having the timing signal and the vibration amplitude signal during a predetermined period of time frame integrated.

3. The method according to claim 2, wherein the hard disk drive throughput rate is generated by receiving the timing signal and read/write information on basis of number of times the hard disk drive writes or reads data in a fixed size during a predetermined data flow sampling time period, and having the timing signal and the read/write information during the predetermined period of time frame integrated.

4. The method according to claim 3, the number of times the hard disk drive writes or reads the data in the fixed size during the predetermined data flow sampling time period is derived by calculating the data flow sampling time period according to multiples of an analysis bandwidth, calculating a maximum capability of data writing/reading within the analysis bandwidth according to the analysis bandwidth and a maximum throughput of the hard disk drive, setting a signal sampling resolution, and calculating the fixed size according to the maximum capability of data writing/reading and the signal sampling resolution, and recording the number of times the hard disk drive writes or reads the data in the fixed size during the data flow sampling time period.

5. The method according to claim 4, wherein the linear relationship is calculated by calculating according to a coherence formula to derive a coefficient of the coherence formula corresponding to each frequency in the analysis bandwidth, and determining whether the coefficient of the coherence formula corresponding to the frequency in the analysis bandwidth is larger than a predetermined threshold, wherein when the coefficient of the coherence formula corresponding to the frequency is larger than the predetermined threshold the linear relationship between the vibration sensing frequency function and the hard disk drive flow frequency function is established and the frequency is recorded as a resonant frequency.

6. The method according to claim 1, wherein the time domain-to-frequency domain transformation is performed on basis of Fast Fourier Transform.

7. The method according to claim 1, wherein the vibration source is the hard disk drive or a cooling fan.

8. The method according to claim 7, wherein the counter vibration control signal is a fan rotating speed control signal or a hard disk drive shutdown signal.

9. The method according to claim 2, wherein the vibration sensing device is an accelerometer disposed on the hard disk drive, in proximity of the hard disk drive, or on a casing of the computer device.

10. The method according to claim 2, wherein the vibration sensing device further comprises a vibration sensing receiver and a vibration sensor, with the vibration sensing receiver implemented in terms of an independent detecting equipment disposed outside the computer device for receiving a vibration amplitude generated by the vibration sensor and connected to the computer device through a connector, which transmits the vibration amplitude signal associated with the vibration source.

11. A system disposed in a computer device and capable of determining a hard disk drive throughput and a vibration source, wherein the system is coupled to a vibration sensing device and at least one hard disk drive, comprising:
   a vibration signal generating unit for receiving a timing signal generated by the computer device and a vibration amplitude signal generated by the vibration sensing device for the vibration source substantially at the same time, for generating a vibration sensing signal;
   a data traffic accumulation unit, for receiving the timing signal and read/write information on basis of number of times the hard disk drive writes or reads data in a fixed size during a predetermined data flow sampling time period substantially at the same time, for generating a hard disk drive throughput rate according to the timing signal and the number of times the hard disk drive writes or reads the data in the fixed size during the predetermined data flow sampling time period, wherein the data flow sampling time period is on basis of multiples of a analysis bandwidth;
   a calculating unit, coupled to the vibration signal generating unit and the data traffic accumulation unit, for receiving the vibration sensing signal and the hard disk drive throughput rate, which is generated along with the vibrations sensing signal substantially at the same time, and performing a time domain-to-frequency domain operation on the vibration sensing signal and the hard disk drive throughput rate in order to prepare a corresponding vibration sensing frequency function and a corresponding hard disk drive flow frequency function, wherein the calculating unit receives the vibration sensing signal and the hard disk drive throughput rate according to the timing signal;

a storage unit coupled to the calculating unit, for storing the vibrations sensing frequency function and the hard disk drive flow frequency function;

a comparison unit coupled to the calculating unit for comparing the vibration sensing frequency function and the hard disk drive flow frequency function and preparing vibration information affecting the hard disk drive throughput, wherein the vibration information includes at least one resonant frequency; and a counter vibration driving unit, according to the vibration information for generating a counter vibration control signal.

12. The system according to claim 11, wherein the vibration source is the hard disk drive or a cooling fan.

13. The system according to claim 12, wherein the counter vibration control signal is a fan rotating speed control signal or a hard disk drive shutdown signal.

14. The system according to claim 11, wherein the vibration sensing device further comprises a vibration sensing unit for detecting a vibration of the hard disk drive associated with the vibration source and generating a corresponding vibration amplitude associated with the vibration of the hard disk drive.

15. The system according to claim 14, further comprising an analog-to-digital conversion unit for performing an analog-to-digital conversion on the vibration amplitude in order to generate the corresponding vibration amplitude signal before outputting the vibration amplitude signal to the vibration signal generating unit.

16. The system according to claim 14, wherein the vibration sensing device is disposed on the hard disk drive, in proximity of the hard disk drive, or on a casing of the computer device.

17. The system according to claim 15, wherein the vibration sensing unit and the analog-to-digital conversion unit are independently disposed, with the vibration sensing unit disposed within the computer device and the analog-to-digital conversion unit disposed within a vibration sensing receiver and a vibration sensor, which is disposed outside the computer device for receiving the vibration amplitude generated by the vibration sensor and transmitting the vibration amplitude signal associated with the vibration source to the computer device through a connector.

18. The system according to claim 14, wherein the vibration sensing unit is an accelerometer.

19. The system according to claim 11, wherein the computer device is a server or a disk storage system.

* * * * *